US007433311B1

(12) United States Patent
Kalyanasundaram et al.

(10) Patent No.: US 7,433,311 B1
(45) Date of Patent: Oct. 7, 2008

(54) METHODS AND APPARATUS FOR ALLOCATING RESOURCES IN A COMMUNICATIONS SYSTEM

(75) Inventors: Balasubramanian Kalyanasundaram, Herndon, VA (US); John G. Waclawsky, Fredrick, MD (US); Mahendran Velauthapillai, Adelphi, MD (US)

(73) Assignee: Cisco Technology, Inc., San Jose, CA (US)

( * ) Notice: Subject to any disclaimer, the term of this patent is extended or adjusted under 35 U.S.C. 154(b) by 1536 days.

(21) Appl. No.: 09/812,134

(22) Filed: Mar. 19, 2001

(51) Int. Cl.
*H04L 12/26* (2006.01)

(52) U.S. Cl. ........................ 370/235; 370/252

(58) Field of Classification Search ................ 370/230, 370/235, 337, 347, 348, 468, 252, 462
See application file for complete search history.

(56) References Cited

U.S. PATENT DOCUMENTS

| | | | | |
|---|---|---|---|---|
| 5,258,979 | A * | 11/1993 | Oomuro et al. | 370/232 |
| 5,559,798 | A * | 9/1996 | Clarkson et al. | 370/468 |
| 5,815,492 | A | 9/1998 | Berthaud et al. | 370/234 |
| 5,953,344 | A | 9/1999 | Dail et al. | 370/443 |
| 6,011,776 | A * | 1/2000 | Berthaud et al. | 370/232 |
| 6,021,268 | A | 2/2000 | Johnson | 395/500.24 |
| 6,122,514 | A | 9/2000 | Spaur et al. | 455/448 |
| 6,304,549 | B1 * | 10/2001 | Srinivasan et al. | 370/230 |
| 6,434,380 | B1 * | 8/2002 | Andersson et al. | 455/406 |
| 6,570,860 | B2 * | 5/2003 | Hamalainen et al. | 370/329 |
| 6,631,118 | B1 * | 10/2003 | Jones | 370/252 |
| 6,665,273 | B1 * | 12/2003 | Goguen et al. | 370/252 |
| 6,745,221 | B1 * | 6/2004 | Ronca | 718/104 |
| 7,095,759 | B1 * | 8/2006 | Fitzgerald | 370/538 |

* cited by examiner

*Primary Examiner*—Firmin Backer
*Assistant Examiner*—Christine Ng
(74) *Attorney, Agent, or Firm*—Brinks Hofer Gilson & Lione

(57) ABSTRACT

The invention provides a system including methods and apparatus that adjust usage of one or more resources of a data communications channel. The system can negotiate a current resource setting for usage of the resource of the communications channel and can perform communications on the communications channel using the resource. The resource can be, for example, a bandwidth setting of the communications channel. Periodically, the system can renegotiate a new value for the current resource setting upon detecting a negotiation event during performance of communications on the communications channel using the resource. One such negotiation event is an indication that an accrued usage cost of the resource of the communications channel substantially equals or exceeds a cost to renegotiate the current resource setting. Another negotiation event indicates that an actual resource setting of the communications channel substantially equals or exceeds the current resource setting for the communications channel. Another negotiation event indicates that a data communications device using the bandwidth setting of the communications channel has requested to negotiate a new value for the current resource setting of the communications channel.

26 Claims, 4 Drawing Sheets

100
120-N
CLIENT COMMUNICATIONS DEVICE
125
CLIENT RESOURCE NEGOTIATOR
120-3
120-2
120-1
130-3
130-2
130-1
130-M
135
RESOURCE NEGOTIATION (E.G., RESOURCE CAN BE BANDWIDTH, POWER, BAUD RATE, RELIABILITY, ETC.)
115
NETWORK RESOURCE ALLOCATOR
110
NETWORK COMMUNICATIONS DEVICE (E.G., WIRELESS BASE STATION, NETWORK ACCESS SERVER, ETC.)
105
NETWORK (E.G., WIRELESS PHONE NETWORK, COMPUTER NETWORK, INTERNET, ETC.)

METHODS AND APPARATUS FOR ALLOCATING RESOURCES IN A COMMUNICATIONS SYSTEM

FIELD OF THE INVENTION

The present invention generally relates to mechanisms and techniques for controlling the allocation of resources in a communications channel, and more particularly, to a system that allows for allocating resource(s) or changing the allocation of resources in a communications channel while performing communications on the communications channel using the resource(s).

BACKGROUND OF THE INVENTION

Using conventional communications techniques, electronic and/or computerized devices can communicate with each other using one or more communications channels. There can be many different forms of communications channels, but each generally represents an allocation of one or more resources of the mechanisms (e.g. data communications devices, data links or bandwidth) which support communications on the channels. Depending upon the type of communications involved (e.g., wireless versus electronic or land-line), the particular allocation of resources for a communications channel may vary.

By way of example, a networked data communications device such as a router or switch that operates in a computer network such as the Internet might require the ability to provide a certain amount of bandwidth (i.e., throughput of data over time) on one or more communications channels to allow computer systems or other devices connected to the computer network to perform data communications with each other over the channels. In this example, bandwidth is one resource that the router or switch can allocate to a communications channel (e.g., the connection path or flow of information for the device) in varying amounts. The data communications device might allocate large amounts of bandwidth to some computer systems, while other computer systems might only receive or require lesser amounts of the bandwidth resource.

As another example, in a wireless communications system, a wireless device such as a wireless telephone (e.g., a cell phone) can communicate with a wireless base station transceiver (e.g., a cellular communications tower or antenna) over one or more wireless communications channels or links allocated to the wireless device by the base station. The resources which form such a wireless communications channel may include, for example, transmit and receive frequencies, timeslots in which to transmit (e.g., in time division multiple-access (TDMA) wireless systems), frequency codes used for encoding data (e.g., in code division multiple-access (CDMA) wireless systems), and/or power levels at which to transmit information.

The amount of a resource that a communications device can allocate to a communications channel can depend upon a number of factors such as the physical characteristics of the connection, data link or medium supporting the communications channel (e.g., wireless vs. electrical vs. optical connections), software configurations of the devices (e.g., communications protocols in use), hardware configurations of the devices (e.g., buffer sizes, memory sizes, processing and circuitry speeds of processors and circuitry within the device), number of other devices competing for the resources, authorization policies for use of the resources, and so forth. As an example, if a data communications device provides a data communications channel at a bandwidth of 128 Kilobits per second (Kbps), if multiple computer systems need to concurrently transmit data over this channel (i.e., using this link), then each device will have to share the 128 Kbps bandwidth resource of that channel. Since computer systems often transmit data in a bursty manner (i.e., not as a steady flow of information), it might be the case that one computer system requires more use of the resource (the 128 Kbps bandwidth of the channel) at one point in time than another computer system which is not transmitting large amounts of data at that moment in time.

Network engineers have developed data communications protocols to allow a computer system to "reserve" an amount of bandwidth over a communications channel for use by a specific device. One such protocol is called the Reservation Protocol (RSVP). RSVP allows a destination computer system that is receiving a stream of data (e.g., a stream of packets using the Internet Protocol or IP) from a particular source computer system to send an RSVP request message upstream along the path of networked data communications devices (e.g., along the path of routers and/or switches) that transport the stream of packets from the source computer system to the destination computer system. The upstream RSVP request message requests that each data communications device along the path reserve or set-aside a particular amount of bandwidth for use by the stream of packets being transmitted from the source to the destination computer system. Each data communications device (e.g., each router or switch in the network) along the path that receives the RSVP request message can allocate bandwidth resources (e.g., virtual circuits, data buffers, and so forth) to handle the forthcoming packets of information for the stream of data. Once a data communications device reserves bandwidth resources for a particular stream of data, those resources are not used for transporting other streams of data through the data communications device for as long as those resources remain allocated for a particular data stream. In this manner, a requesting computer system can establish or pre-allocate a set of resources in a data communications channel for use in transporting information through a series of data communications devices in a network. Once the communications session using the reserved resources is complete (i.e., once communications has ended), the destination computer system can send an RSVP release message to each data communications device in the path of the stream of data in order for those data communications devices to release the resources allocated to the stream of data.

In conventional communications systems, users of data communications channels (e.g., users controlling the devices that require the use of communications channels) often pay varying costs for varying qualities of service. Generally, a data communications device that provides higher qualities of service allocates or reserves more data communications channel resources on behalf of the devices (e.g., end user devices) requiring such resources. A communications service provider (e.g., an Internet or wireless network service provider) typically charges a higher proportional cost per unit of time to users of data communications channels that have a high allocation of resources, whereas the service provider charges a lower proportional cost for data communications channels that offer lower qualities of service and which have fewer allocated communications channel resources.

Using the RSVP example above to illustrate this point, prior to reserving bandwidth for the stream of data, the source and destination computer systems might pay a particular price for use of the data communications channel at a particular unreserved or shared multi-user bandwidth level. The quality of service level for which the source and destination computer systems pay might allow for varying levels of bandwidth resource consumption during use of the communications channel by all devices sharing the resources of the channel. Without the use of RSVP, users (e.g., source and destination computer systems) of a data communications channel might pay a shared rate (e.g., one dollar per hour) for use of the data communications channel. The data communications channel bandwidth provided within the network at the shared rate may not guarantee that any device has exclusive use of the channel at a particular bandwidth. However, when a computer system uses a resource allocation protocol such as RSVP to reserve or set-aside a guaranteed amount of bandwidth for its own use, the user of that computer system must pay a higher price or cost per unit of time for those resources in order to be guaranteed the quality of service (i.e., the reserved bandwidth level) requested for the data communications channel.

SUMMARY OF THE INVENTION

Conventional techniques for managing the allocation of resources in a communications channel suffer from a number of deficiencies. Generally, such deficiencies arise from the fact that conventional techniques that provide for the allocation of resources in a data communications channel are generally static in nature. That is, when a conventional resource allocation technique such as RSVP is used to allocate resources in a data communications channel for use by a particular device, the device makes the resource allocation ahead of time, or before the communications actually take place. As such, the resource allocation is, at best, an estimate of the required resources needed to handle any expected communications requirements. If the estimate is inaccurate, then too much or too little amounts of resources are allocated in the data communications channel in compared to what is actually required to perform communications.

Furthermore, conventional techniques for allocation of resources in a communications channel do not typically take into account changing data communications or network conditions and do not continually and dynamically allocate an optimal amount of resources for use in a communications channel based upon actual usage requirements. For example, consider a scenario in which a computer system or other communications device reserves a particular resource at a predefined level in a data communications channel using conventional non-adaptive resource allocation techniques (e.g., RSVP). Now suppose that the computer system for which the resource is reserved does not require the full amount of allocated resources to effectively perform communications. This might happen because the estimated amount of allocated resources is too high for the actual required need. The results of this scenario are that the unused portions of allocated resources remain unused by all devices in the data communications system (since they are set aside for only one device) and that the device (e.g., computer system, wireless device or other device which requested reservation of the resources) for which the resources are over-allocated pays more cost than was actually required due to the fact that more resources were reserved and hence paid for than were required.

In contrast to conventional systems and techniques for managing resource allocation in communications systems, embodiments of the present invention provide mechanisms and techniques to allow for the dynamic negotiation of resource(s) of a data communications channel based on factors such as cost of the resource over time and the current need for the resource by one or more communications devices. In particular, embodiments of the invention provide the ability for a device (or for a user controlling a device) to dynamically negotiate for a resource such as bandwidth in a data communications channel in response to changing network conditions, popularity of service, device or user needs, cost metrics for use of a resource, and/or other criteria.

Generally, embodiments of the invention seek to adjust resource allocation to more optimal settings. Embodiments of the invention enable a current level, amount or setting of a resource (or resources) allocated for use by or within a communications channel (referred to herein as the "current resource setting" for that resource of that channel) to be dynamically adjusted so that the current resource setting converges upon an amount that is actually required for use by a device or devices performing communications on a communications channel using that resource (or resources). Each time the current resource setting is recalculated (based on certain events, as will be explained), the device performing the recalculation can then negotiate with another device (e.g., a communications device in the network that is capable of allocating the resource at different levels or settings, referred to herein as a device operating a "network resource allocator" process or application) to cause the resource (e.g., bandwidth) to be allocated at the re-calculated value of the current resource setting. By periodically performing such resource allocation negotiation, the communications device (e.g., end user device) that is paying for the resource as a cost per unit of time pays for a more accurate allocation of the resource.

More specifically, embodiments of the invention provide methods and apparatus for adjusting usage of a resource of a data communications channel upon detection of certain types of negotiation events. Communications devices in which embodiments of the invention may operate include end-user operated client communications devices such as wireless telephones, personal computer systems and workstations, personal digital assistant devices, handheld computing devices or other such devices that operate in either a wireless or land-line network environment and that communicate information such as voice, data or other information with networked communications devices such as wireless base stations, network access servers, routers, switches, hubs, gateways, proxies or other such networked devices which form the infrastructure of a communications network. Embodiments of the invention are applicable to voice networks, data networks, wireless networks, computer networks, or any combination of these or other types of communications systems or networks.

In particular, method embodiments of the invention include methods for adjusting usage of a resource of a communications channel. One such method embodiment comprises the steps of negotiating a current resource setting for usage of the resource of the communications channel, performing communications on the communications channel using the resource, and periodically renegotiating a new value for the current resource setting upon detecting a negotiation event during performance of communications on the communications channel using the resource.

The process of negotiating the current resource setting typically occurs between a device such as a wireless or land-line networked end-user device, referred to herein as a client communications device, and a network communications device such as a switch, router, base station or other device within a communications network, though such negotiation can occur between any device operating according to embodiments of the invention and any other communications device. The actual technique to negotiate a current resource setting for a resource (e.g., bandwidth) can be any type of messaging or communications protocol that operates between a client communications device and the network infrastructure, such as RSVP or another type of handshaking of message exchange technique that allows the client communications device to indicate to the network communications device that a certain amount of a resource is to be allocated within one or more communications channels on behalf of that client communications device.

The resource can be one or more of any type of resource used or involved in the use or support of providing communications on the communications channel. Examples of resources for which embodiments of the invention can adjust are bandwidth, quality of service levels, baud rates, error correction capabilities, security levels, connection rates, buffer allocations, virtual circuits, connections, or other types of resources that communications devices can provide, support, or otherwise enable for use in a communications channel.

According to another embodiment of the invention, the negotiation event indicates that an accrued usage cost of the resource of the communications channel substantially equals a cost to renegotiate the current resource setting. Generally, the accrued usage cost is the cost of use of the resource by the device since the last negotiation. The accrued usage cost may calculated using various techniques according to various embodiments of the invention.

In one embodiment, the accrued usage cost is calculated to represent a total accrued cost (e.g., accrued total usage cost) of resource allocation to the device. That is, an accrued usage costs that reflects an accrued total usage cost is the cost of using the device at the level of bandwidth allocated to the device, irrespective of how much of the resource is actually consumed or used by the device.

In another embodiment, the accrued usage cost is calculated to represent an actual accrued cost (e.g., accrued actual usage cost). An accrued usage cost which is calculated to represent an accrued actual usage cost reflects a cost of bandwidth as actually used or consumed by the communications device, irrespective of how much bandwidth is actually allocated to the communications device.

In yet another embodiment, the accrued usage cost is calculated to represent an excess accrued cost (e.g., accrued excess usage cost). An accrued usage cost which is calculated to represent an accrued excess usage cost reflects a cost of bandwidth as allocated, but not used by the communications device. In other words, an accrued excess usage cost is an amount of costs, money or charge that a user of the device pays for that covers the difference between an actual amount of a resource used by the communications device versus the amount allocated to that device.

In still another embodiment, the accrued usage cost is a combination of some or all of the above accrued usage cost calculations or is another cost value or metric imposed by a communications service provider that reflects a cost for the use of one or more resources of a communications channel over a period of time (e.g., the time since the last negotiation event) by a communications device.

The cost to renegotiate the current resource setting is a cost or charge (e.g., a monetary charge) levied or imposed by the communications service provider (e.g., a network service provider such as an Internet Service Provider (ISP), wireless carrier, telephone company, or other communications provider) on the user of the communications device using the resource in order for that device to perform the negotiation process. That is, the ability to renegotiate a new resource setting has a charge associated with this action. If this change equals the current value of the accrued usage cost of the resource since the last negotiation, then a negotiation event occurs at which point the communications device calculates and negotiates a new value for the current resource setting.

In another embodiment, the negotiation event indicates that either an actual resource usage setting of the communications channel substantially equals the current resource setting for the communications channel, or that an actual resource setting of the communications channel substantially exceeds the current resource setting for the communications channel. The actual resource usage setting of the device is the current real-time value of the amount or level of the resource required at that point in time. If this value substantially equals or exceeds the current resource setting (i.e., the amount of the resource currently allocated to the device), then the device's use of the resource has increased and a negotiation event occurs causing the device to recalculate a new value for the current resource setting and renegotiate for an allocation of that resource at that new value.

In yet another embodiment, the resource is a bandwidth setting of the communications channel and the negotiation event indicates that a data communications device using the bandwidth setting of the communications channel has requested to negotiate a new value for the current resource setting for the bandwidth setting of the communications channel. In this embodiment, the user of the device is able to trigger renegotiation of the resource, for example, via depressing a button on the device.

In such embodiments then, a communications device renegotiates for a new resource setting (the value of the current resource setting) when any of such negotiation events occur.

In another embodiment, the step of periodically renegotiating a new value for the current resource setting upon detecting a negotiation event comprises the steps of detecting a negotiation event related to the resource and in response to the step of detecting, calculating a new value for the current resource setting that more closely approximates a value of an actual resource usage of the resource of the communications channel. The method then performs the step of negotiating with a resource allocator to establish the new value for the current resource setting. The resource allocator is preferably a process operating within the network communications device (e.g., the based station, switch or router) that can allocate the resource as requested in the step of negotiation.

In another embodiment, if a value of the actual resource usage setting is lower than a former value of the actual resource usage setting, the new value of the current resource setting is calculated to be lower than a former value of the current resource setting. In this embodiment, the current resource setting is thus reduced as less and less of the resource is required for use by the client communications device.

In a further embodiment, if a value of the actual resource usage setting is higher than a former (i.e., prior) value of the actual resource usage setting, the new value of the current resource setting is calculated to be higher than a former value of the current resource setting. In this manner, if usage of the resource continually rises due to more communications channel resource being required for use in communications by the device, then the resource allocated to the device according to the techniques of embodiments of the invention will also rise accordingly.

In still another embodiment, the step of calculating a new value for the current resource setting comprises the steps of calculating a new value for a minimum resource setting, calculating a new value for a maximum resource setting and then calculating the new value for the current resource setting to be a new value approximately between the value for the minimum resource setting and the value for the maximum resource setting. The minimum and maximum resource setting represent a range of resource settings between which the current resource setting is established. The minimum and maximum resource settings are calculated in specific ways, depending upon what negotiation event the communications device detects.

In one embodiment, the step of calculating the new value for the current resource setting comprises the steps of calculating a summation value to be the sum of the new value for the maximum resource setting and the new value for the minimum resource setting. Then the method calculates the new value for the current resource setting to be the summation value divided by two. In this manner, the current resource setting is established at a mid-point value or level between the maximum and minimum resource setting values. This embodiment also sets a value of the peak resource usage to be a maximum of a current value of the actual resource usage and a current value of a peak resource usage. The peak resource usage setting represents a maximum value of usage of the resource since the most recent negotiation for a current resource setting. The client communications device continually tracks certain resource setting values while operating according to the invention. Such continually tracked resource setting variables include the accrued usage cost, actual resource usage setting and peak usage resource setting.

In another embodiment, the step of calculating a new value for a minimum resource setting calculates the new value of the minimum resource setting to be a maximum of a peak resource usage and a current value of the minimum resource setting. Also in this embodiment, the step of calculating a new value for a maximum resource setting sets the new value of the maximum resource setting to be the maximum of the value of the current resource setting and the value of the actual resource usage setting.

Preferably, in one embodiment, the aforementioned calculations of minimum and maximum resource settings are done in response to detecting a negotiation event that indicates that an accrued usage cost of the resource of the communications channel equals (or substantially equals) or exceeds a cost to renegotiate the current resource setting.

In another embodiment, the step of calculating a new value for a minimum resource setting sets the new value of the minimum resource setting to be the value of the current resource setting and the step of calculating a new value for a maximum resource setting calculates the new value of the maximum resource setting to be a maximum of a maximum resource setting and a current value of the actual resource usage setting.

Preferably, in the aforementioned calculations of minimum and maximum resource settings are done in response to detecting a negotiation event that indicates that either an actual resource setting of the communications channel substantially equals the current resource setting for the communications channel, or that an actual resource setting of the communications channel substantially exceeds the current resource setting for the communications channel.

In still another embodiment, the method sets the maximum resource setting to a value of an upper limit of the current resource setting and setting the minimum resource setting to a value of the actual resource usage setting if, during the performance of communications on the communications channel using the resource, the maximum resource setting substantially equals or is less than the minimum resource setting. The upper limit of the current resource setting represents the highest value, level, or setting at which the resource can be allocated.

In still a further embodiment, the step of negotiating a current resource setting for usage of the resource of the communications channel comprises the steps of initializing the new value for the minimum resource setting, the new value for the current resource setting, and a value for a peak resource usage to be a current value of the actual resource usage of the resource of the communications channel. This method embodiment also initializes the new value for a maximum resource setting to be a value of an upper limit of the current resource setting of the resource of the communications channel and negotiates with a resource allocator (e.g., a process operating in a network communications device) to establish the new value for the current resource setting.

Embodiments of the invention also include communications devices configured to operate according to the invention. As noted herein, such communications devices can be any type of electronic or computerized communications device. In particular, such a communications device can comprise a communications interface, a memory system, a processor and an interconnection mechanism coupling the communications interface, the memory system, and the processor. The memory system is preferably configured with a resource negotiation application (e.g., software such as object code or source code that the processor can interpret), that when performed (e.g., executed, run, interpreted or otherwise operated) on the processor, provides a client resource negotiation process to adjust usage of a resource of a communications channel by performing the operations of any or all of the aforementioned method embodiments via software control, or via hardware and/or software configured to perform those methods and the techniques disclosed herein as the invention.

Other embodiments of the invention that are disclosed herein include software programs to perform the operations of embodiments summarized above and disclosed in detail below. More particularly, a computer program product is disclosed which has a computer-readable medium including computer program logic encoded thereon to adjust usage (e.g., adjust an allocation) of a resource (or resources) according to this invention and its associated operations. The computer program logic, when executed on at least one processor within a communications device, causes the processor to perform the operations (e.g., the method embodiments above, and described in detail later) indicated herein. This arrangement of the invention may be provided as software on a computer readable medium such as an optical medium (e.g., CD-ROM), floppy or magnetic hard disk or other such medium such as firmware in one or more ROM or RAM or PROM chips (e.g., EPROM or EEPROM) or as an Application Specific Integrated Circuit (ASIC). The software, firmware or other such configurations can be installed onto a communications device to cause the communications device to perform the techniques explained herein as the invention.

It is to be understood that the system of the invention can be embodied strictly as a software program, as software and hardware, or as hardware alone. Is also to be understood that the techniques and mechanisms of this invention typically perform (e.g., execute, run, or are otherwise operated) on one or more communications devices that operate in any type of communications system. The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
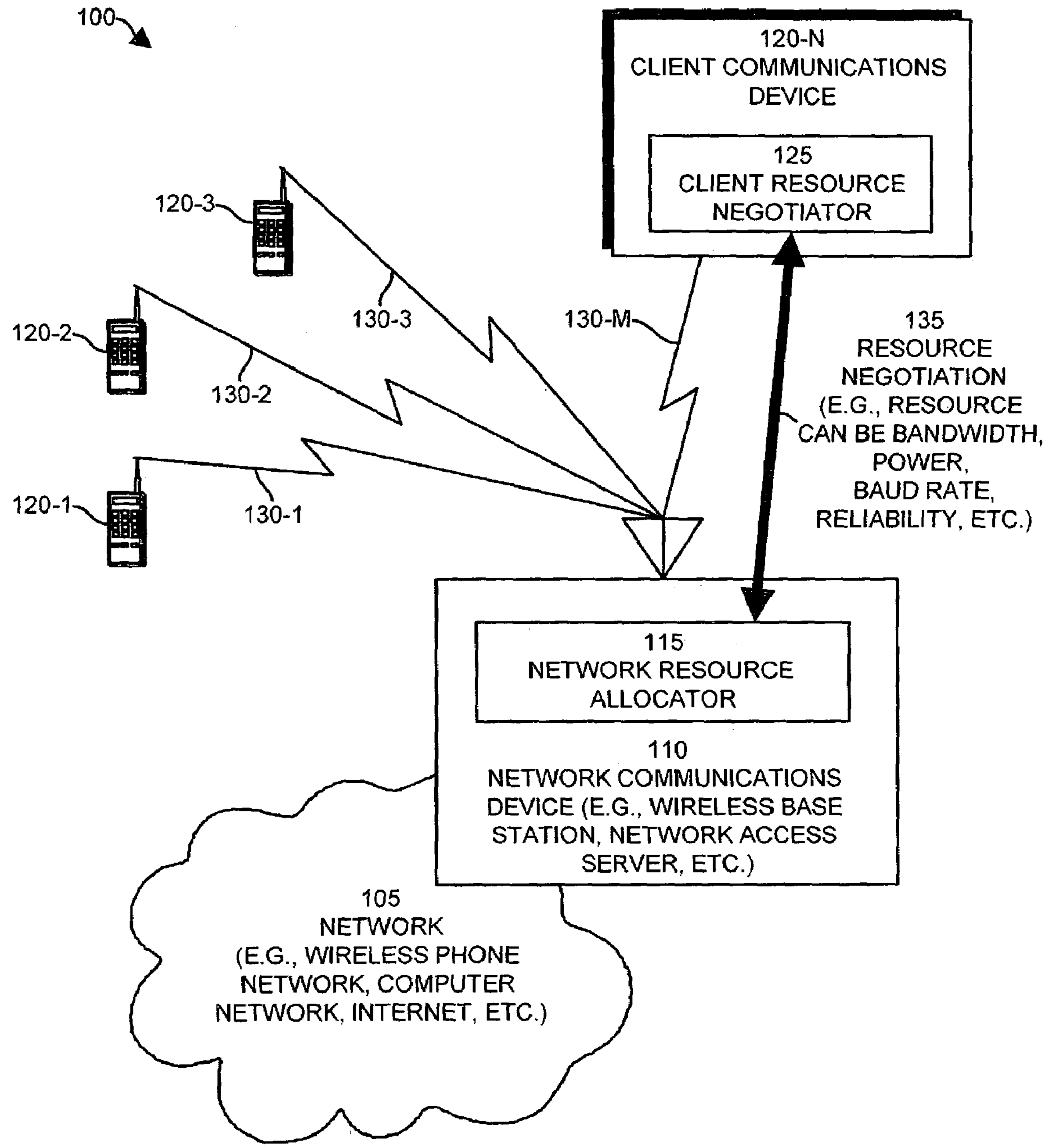
FIG. 1 illustrates a network and computing system environment that is suitable for use in describing example operations of embodiments of the invention.

Embodiments of the present invention provide techniques and mechanisms that operate within communications systems to allocate resources (one or more) that support one or more data communications channels between communications devices in such a system. The techniques and mechanisms of embodiments of the invention can be applied to resource allocation in a variety of different types of communications systems including wireless communications systems (e.g., wireless telephone or data communications systems), land-line communications systems (e.g., computer networks, voice networks or other data or information networks) or a combination of such systems. Preferably, embodiments of the invention operate within devices which communicate in communications systems that have costs associated with resources which may be allocated to the communications channels used by communications devices in the system. That is, while the invention is not limited to the allocation of a specific resource in a specific type of communications system, preferred embodiments adjust allocations of resources which are charged to users of the communications channel at varying levels of cost over periods or units of time (e.g., 10 cents per minute of use of a particular resource).

As an example, consider a wireless communications system which allows a user of a handheld wireless computing device (e.g., cellular telephone equipped possibly with web browser technology) to access data over a wireless link to a computer network. In order to support such communications (in this case, data communications), the system establishes and maintains a communications channel between the wireless computing device and a base station transceiver (e.g., a cellular base station antenna). Depending upon the type of wireless communications technology in use (e.g., CDMA, TDMA, or another technology), an associated set of communications channel resources are required for use by the base station and/or the wireless computing device to communicate over the communications channel. For instance, in a CDMA wireless system, the communications channel may be comprised of one or more frequency codes, frequency channels and power levels assigned to the wireless computing device. The frequency codes allow the wireless communications device and the base station to encode information (representing voice or other data) on the assigned frequency channel(s) for transmission over the communications channel. The number of frequency codes and frequency channels available to a particular wireless base station are typically limited to predefined values. As such, the frequency codes and frequency channels represent a pool of resources which are limited.

Typically, in such a communications system, the base station transceiver is responsible for allocating frequency codes and frequency channels to wireless computing devices which require such resources to perform communications. The base station transceiver may also be responsible for setting and adjusting other communications channel resources such as the transmission power levels at which each wireless computing device transmits encoded data on the frequency channel(s) allocated to that device. By varying the amount of resources (transmission power levels, frequency codes and frequency channels) allocated to a particular wireless computing device, the overall bandwidth or throughput of data which may be sent to or from that wireless computing device can be controlled.

As an example, if a base station instructs (e.g., via a control communications channel) a particular wireless computing device to transmit at a relatively low power level, the maximum bandwidth (i.e., maximum data rate over a period of time) at which that wireless computing device can transmit data is relatively low. If the base station instructs the wireless computing device to raise its transmission power level, the wireless computing device is typically able to transmit more data due to a reduced error rate over an equivalent period of time thus increasing the overall bandwidth allocated to device. However, allowing that wireless communications device to increase its power level may require that the base station instruct another wireless communications device to decrease its transmission power level so as to not interfere with the device which has been allocated the higher transmission power level and hence the higher bandwidth.

In such a wireless communications system as that described above, an embodiment of the invention can operate within one wireless computing device to allow the wireless computing device to calculate or otherwise determine a current resource setting which represents an optimal amount of resource(s) which should be allocated to that device at that point in time during communications. Embodiments of the invention then allow the wireless computing device to negotiate, as will be explained, with a network communications device such as the wireless base station in order to have the wireless base station allocate the requested amount of resources to the wireless computing device. There is a charge (i.e., a monetary cost) applied to perform such a negotiation, irrespective of how much of an allocation of resources results from the negotiation. Thereafter, during performance of communications by the device using the resource(s) at the currently allocated level or setting, certain events called "negotiation events" can occur and the communications device (i.e., the wireless device in this example) can detect these events and can calculate a new value for the resource setting (called the "current resource setting") and can re-negotiate for the new value (i.e., can request that the resource be assigned at the new value of the current resource setting). The new value of the resource setting is computed to be a more accurate requirement of the resource when performing communications on the data communications channel using the resource.

Embodiments of the invention thus result in a more optimal allocation of resources to devices in the communications system based on a balance of use and cost requirements. As a result, the embodiments of the invention significantly avoid the problems of conventional resource allocation techniques which over-allocate or under-allocate resources. Embodiments of the invention also result in reduced resource cost charges for the communications device (i.e., the wireless computing device communications channel costs in this example) since the device only requests (i.e. negotiates) an allocation of resources which it needs based on current communications requirements.

In particular, embodiments of the invention allow the communications device to adjust the allocation of resources associated with or assigned to the device through a technique referred to herein as resource negotiation (or renegotiation). Resource negotiation preferably takes place upon the occurrence of certain negotiation events and, as noted above, the process of negotiating for a particular resource setting has an associated cost. That is, if a device operating according to embodiments of the invention desires to negotiate for a new resource setting (e.g., an increase or decrease in bandwidth), a cost is charged to the device (e.g., is passed on to the user who pays a monthly invoice for the communications services allowing the device to communicate within the communications system) for the process of negotiation for that particular resource setting.

In addition, embodiments of the invention are based in part on the premise that use of a particular resource over time varies from what is allocated and may accrue an associated cost as well. This cost, referred to herein as the accrued usage cost, may be calculated as explained above in a number of different ways to reflect either an actual usage cost, an actual excess usage cost, or a total usage cost or a combination thereof. Using the wireless example explained above, perhaps the user of the wireless computing device pays ten cents a minute for access to a wireless communications channel at a specific prescribed bandwidth (e.g., 20 kbps). As communications takes place over the wireless communications channel between the wireless computing device and the base station providing the communications channel, an accrued usage cost accumulates over time is the full bandwidth is not used. This represents the actual excess usage cost of communicating at the prescribed bandwidth for the time period of communications. That is, the more time that is spent communicating at less than full bandwidth which results in a higher accrued usage cost.

A communications device operating an embodiment of the invention can perform a variety of tests that can detect various negotiation events in order to determine when the time has arrived to renegotiate for a particular resource setting. Upon the detection of a negotiation event, the communications device can then compute a new value for the current resource setting and can then renegotiate for the current resource setting in order to establish the new value for the current resource setting as a current allocated value for a particular resource being used to support the communications channel. In addition, embodiments of the invention allow the device to adjust maximum and minimum resource setting values which represent a range of resource settings for a particular resource allocation. As an actual usage setting varies within the maximum and minimum range during communications, a negotiation event may occur in a variety of circumstances.

As an example, according to one embodiment of the invention, a negotiation event occurs when an accrued usage cost for a resource in use by the communications device is equal to or greater than a cost to renegotiate the current resource setting. In other words, the communications device operating according to this embodiment of the invention tracks or otherwise is able to continually determine the accrued usage cost for the resource of the communications channel at any point in time during performance of communications. As noted above, the accrued usage cost represents an amount of money, charges or other unit cost that the user of the device will be charged for (i.e., but maybe not used is using actual excess usage cost computation) with respect to use of that particular resource in supporting communications on the communications channel since the last negotiation for the current resource setting. When this cost is equal to (or substantially equal to) or greater than the cost to renegotiate, a negotiation event occurs causing the device to recalculate a new value for the current resource setting for the resource and to renegotiate with the base station for the new value of the current resource setting.

As a specific example when using the excess cost metric for computation of the accrued usage cost, if the communications device has been using a 20 kbps communications channel at eighty percent (80%) capacity for five minutes at a rate of ten cents a minute, than the accrued usage cost for the 20 kbps bandwidth resource is ten cents. If the cost to perform the negotiation for a new value of a current resource setting is also ten cents, then a negotiation event occurs when the accrued usage cost (e.g., ten cents) of the resource of the communications channel is equal to or greater than the cost (e.g., also ten cents in this excess cost example) to renegotiate the current resource setting. When a device operating this embodiment of the invention detects such a renegotiation event, the device calculates or otherwise computes the new value for the current resource setting. The new value preferably more closely approximates a value of an actual resource usage setting of the resource of the data communications channel. That is, the new calculated value for the resource setting calculated to be closer to an actual usage requirement of the resource at that point in time. Accordingly, when the device negotiates for the new value of the current resource setting (i.e. negotiates for the calculated resource value), the device is adjusting the resource setting to be more in line with its actual resource requirements. As these requirements change, the algorithm implemented by embodiments of the invention causes the resource setting (which determines the allocation of the resource to the communications channel) to change along with the changing requirements such that resources are allocated appropriately with less wasted resources, while at the same time attempting to reduce resource and renegotiation costs on behalf of the device requesting the allocation of the resource.

Embodiments of the invention can allow a communications device to detect other negotiation events as well. For example, if additional channel capacity is required then a negotiation event occurs. Stated differently, if the value of an actual resource usage setting, which represents the actual amount of resources required for use by a device at a point in time, is equal to (or substantially equal to) or exceeds the current resource setting which represents the amount of resources allocated to the device at that point in time, a negotiation event occurs causing the device to calculate the new value for the current resource setting and to negotiate for that new value such that resources of the communications channel are allocated at the new value.

As an example, if a particular wireless communications device begins to require more and more of the resource such as bandwidth in order to transmit higher volumes of data (or carry better quality voice), embodiments of the invention operating in such a device can detect a point at which an actual resource usage setting indicating an amount of the bandwidth resource currently in use substantially equals or exceeds the value of the current resource setting. At this point, a new value (a higher value in this scenario) of the current resource setting can be calculated according to embodiments of the invention and the device to renegotiate with a resource allocator (e.g., operating in the wireless base station) within the communications system to establish the allocation of the resource at the new higher level to accommodate the increase bandwidth requirement.

FIG. 1 illustrates a communications environment 100 which operates in accordance with embodiments of the invention. The communications environment 100 comprises a network 105 which represents any type of communications network such as a wireless phone or data network, a computer network such as a Local or Wide Area Network (LAN or WAN), intranet, extranet or the Internet, or another type of communications network. Coupled to the network 105 is a network communications device 110 which represents any type of communications device that can support any type of communications (e.g., voice, data or other types of information). The network communications device 110 includes a network resource allocator 115 configured according to embodiments of the invention. In communications with the network communications device 110 are a plurality of client communications devices 120-1 through 120-N.

The client communications devices 120 represent any type of communications devices that can perform communications (e.g., voice, data or other types) with the network communications device 110 using communications channels 130-1 through 130-M. The client communications devices 120 may all be the same, similar or each may be different from each other. Preferably, each client communications device 120 is configured with a client resource negotiator 125 that operates in accordance with embodiments of the invention. Only client communications device 120-N is illustrated in detail to contain the client resource negotiator 125. It is to be understood that the other client communications devices 121 through 123 are configured in a similar manner to contain a respective client resource negotiator 125.

According to embodiments of the invention, the client resource negotiator 125 within a client communications device 120 can interoperate with (i.e., communicate with) the network resource allocator 115 within one or more network communications devices 110 (only one shown in this example) in order to perform the resource negotiation techniques 135 as explained herein. For purposes of this explanation, the resources for which allocation can be negotiated can be any type of resource associated with the support of one or more communications channels 130 (only one channel 130 shown for each device 120, though each device 120 might use more than one channel 130). Examples of such resources are bandwidth, power levels (e.g., transmission power), baud rates, reliability or quality of service levels, error correction capabilities, encryption or authentication services, or the like.

While the example communications environment 100 illustrated in FIG. 1 shows wireless communications channels 130 operating between the client communications devices 120 and the network data communications device 110, the invention is not limited to operation within wireless communications systems. Rather, it is emphasized that the invention is meant to be general in nature and applicable to all types of communications systems in which resources can be allocated for the support of communications between devices of any type.

Furthermore, it is to be understood that embodiments of the invention are not limited to communications that take place between a single network communications device 110 and a plurality of client communications devices 120. Rather, the invention is applicable in any communications situation such as between a single client communications device 120 and a single network communications device 110 or between two or more network communications devices 110, or between two or more client communications devices 120. That is, any type of computerized or electronic device that includes a communications mechanism to communicate with another type of computerized or electronic device using resources of any type can benefit from the use of embodiments of the invention during allocation of such resources in support of such communications. By way of example, if the invention is implemented within two network communications devices 110 networked with each other, one of such network communications devices can be equipped with a client resource negotiator 125 configured according to embodiments of the invention while the other of such network communications devices 110 can be equipped to operate the network resource allocator 115 as explained herein.

Figure 2:
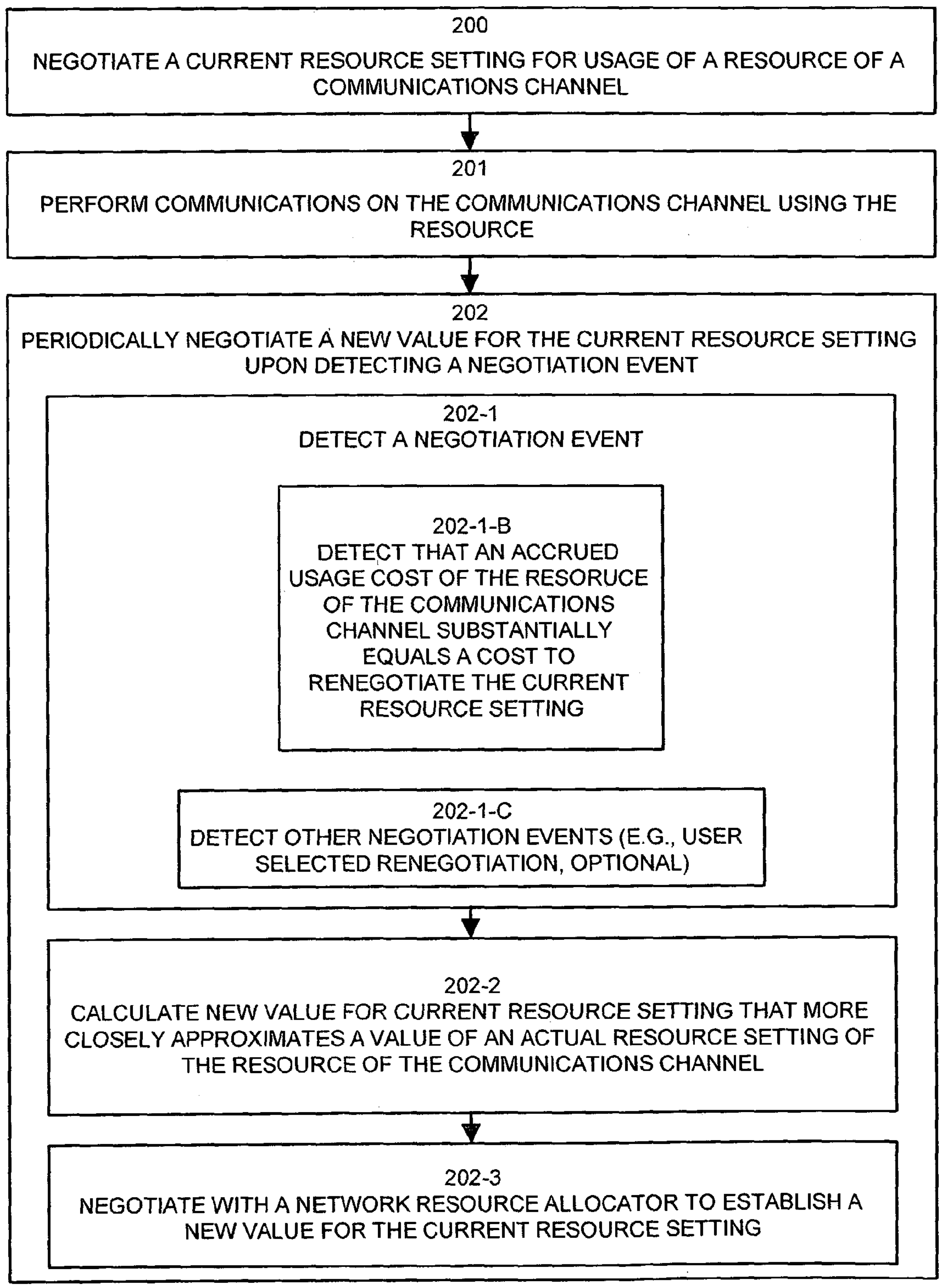
FIG. 2 is a flow chart of processing steps that disclose a method for adjusting usage or allocation of a resource in a data communications channel in accordance with embodiments of the invention.

FIG. 2 shows a flow chart of processing steps as performed by the client resource negotiator 125 within a client communications device 120 configured in accordance with one embodiment of the invention.

In step 200, the client resource negotiator 125 negotiates a current resource setting for usage of a resource of a communications channel 130. This might be, for example, an initial default setting. The client resource negotiator 125 negotiates the current resource setting (e.g., a level or value at which the resource is established, allocated or set to) by communicating with the network resource allocator 115 as shown by the resource negotiation communications exchange 135 in FIG. 1. By way of example, the client resource negotiator 125 can negotiate with the network resource allocator 115 to reserve a particular amount of bandwidth (e.g., 20 Kbps) for the data communications channel 130.

In step 201, once the current resource setting (e.g., 20 kbps) is established for the resource (e.g., bandwidth in this example) of the data communications channel 130, the client communications device 120 performs communications on the data communications channel 130 using the resource. In other words, once the current resource setting such as an amount of bandwidth is established in step 200, the client communications device 120 can utilize the 20 Kbps communications channel 130 to communicate with the network communications device 110. In doing so, the resource allocated in an amount corresponding to the current resource setting (20 kbps in this example) is used at some rate which may vary (e.g., 0 to 20 kbps) during performance of communications on the communications channel 130 between the client communications device 120 and the network communications device 110.

In step 202, during the process of performing communications on the data communications channel using the resource (i.e., during the communications performed in step 201 and hence during usage of the resource), the client resource negotiator 125 periodically renegotiates a new value for the current resource setting upon detecting a negotiation event.

Generally, when the client resource negotiator 125 detects a negotiation event, the client resource negotiator 125 calculates a new value for the current resource setting (e.g., 15 Kbps) that more closely approximates a value of an actual resource usage setting (e.g., 10 Kbps) of the resource of the data communications channel 130. In preferred embodiments of the invention, if a value of the actual resource usage setting (e.g., 10 Kbps, the amount actually in use at that time) is lower than a former value of the actual resource usage setting (e.g., 15 Kbps, an amount of bandwidth formerly in use), the new value of the current resource setting (e.g., 15 Kbps) is calculated to be lower than a former value of the current resource setting (e.g., 20 Kbps). Furthermore, if a value of the actual resource usage setting is higher than a former value of the actual resource usage setting, the new value of the current resource setting is calculated to be higher than a former value of the current resource setting. In this manner, each renegotiation causes the resource to be allocated at a current resource setting that closely reflects actual resource usage requirements at that point in time for the client communications device 120. The current resource setting is typically set somewhat higher than the actual resource usage setting to allow additional resource allocation in case the device 110 requires more of the resource than is actually in use at that moment in time or some time in the near future.

In step 202, as will be explained in detail, during performance of communications by the device using the resource, embodiments of the invention are able to detect various negotiation events that may occur during the operation of the client communications device. In this embodiment, the processing steps associated with detecting certain negotiation events according to certain embodiments of the invention are shown in detail in steps 202-1-A through 202-1-C.

Specifically, in step 202-1-A, the client resource negotiator 125 detects one type of negotiation event when an actual resource usage setting of the data communications channel substantially equals or exceeds the current resource setting for the data communications channel. As noted above, the actual resource usage setting of the data communications channel is preferably an actual amount of the resource that the client communications device 120 wants to use (e.g., is requesting) at any particular point in time during the performance of communications on the communications channel 130. By way of example, in step 200, if the client resource negotiator negotiated a current resource setting of 20 kbps of bandwidth for the communications channel 130, the actual resource usage setting of the data communications channel (i.e., the actual bandwidth in use at any one point in time) might vary during performance of communications between 0 and 20 kbps, depending upon the required bandwidth that the client communications device 130 uses to transmit information on the communications channel 130.

In step 202-1-A then, when the actual resource usage setting (i.e., the actual bandwidth in use, in this example) becomes substantially equal to or exceeds the current resource setting of 20 kbps (e.g., when the device requires substantially the same amount as, or more than the 20 kbps bandwidth current resource setting), the processing of the invention as shown in FIG. 2 detects this occurrence as the negotiation event in step 202-1-A and processing proceeds to step 202-2.

Alternatively, in step 202-1-B, a client resource negotiator 125 configured to perform the processing in FIG. 2 can detect another type of negotiation event when an accrued usage cost of the resource the data communications channel substantially equals the cost to renegotiate the current resource setting. As discussed above, the accrued usage cost of a resource of a data communications channel 130 is the unit price of the resource (e.g., 10 cents per minute) at the current resource setting (e.g., 20 kbps) multiplied by a number of time units since the last negotiation for a value of the current resource setting. For instance, if the client communications device 120 operates for five minutes and allocates 20 kbps of bandwidth for the five minute period, and the unit price is 10 cents per minute at the current resource setting, then the accrued usage cost of the resource of the data communications channel equals 50 cents at that point in time. In step 202-1-B then, when the accrued usage cost (e.g., 50 cents) substantially equals (or exceeds in some embodiments) the cost to renegotiate the current resource setting (e.g., the 50 cent charge for each renegotiation to a new value of the current resource setting), then the client resource negotiator 125 detects this occurrence as a negotiation event.

In yet another alternative embodiment, in step 202-1-C, the client resource negotiator 125 can detect other types of negotiation events. Other negotiation events might include, for example, a user determined negotiation event in which case a user (not specifically shown) of the client communications device 120 specifically instructs the client communications device 120, for example, by pressing a negotiation button (not shown) on the client communications device 120, that the client communications device 120 is to now renegotiate for a new value of a current resource setting (which may also be user specified).

In each case, once the client resource negotiator 125 detects the occurrence of a negotiation event via one of steps 202-1-A through 202-1-C, processing proceeds to step 202-2.

In step 202-2, the client resource negotiator 125 calculates a new value for the current resource setting which more closely approximates a value of an actual resource setting of the resource of the data communications channel 130. In other words, in step 202-2, the client resource negotiator 125 determines a new value for the current resource setting which specifies a resource allocation for the resource of the data communications channel 130 which more accurately approximates an actual required resource allocation based upon current usage characteristics of the resource within the data communications channel 130 by the client communications device 120. In this manner, the client resource negotiator 125 can use the new value for the current resource setting to adjust the allocation of the resource in the data communications channel 130 for more optimal performance of communications by the client communications device 120.

Next, in step 202-3, the client resource negotiator 125 negotiates with the network resource allocator 115 to establish the new value for the current resource setting as calculated in step 202-2. That is, in step 202-3, the resource allocator 115 is instructed to allocate the resource of the communications channel 130, such as a bandwidth setting, to the client communications device 120 at a rate or level indicated by the new value of the current resource setting. In this manner, the client communications device 120 now is able to use the resource of the data communications channel 130 at a level corresponding to the new value of the current resource setting. This translates into paying for the resource at a more accurate cost level or cost metric in relation to how much of the resource is actually being used (or that may be required) at a point in time by the client communications device 120. Stated differently, since the new value of the current resource setting more closely approximates the actual resource usage requirements of the resource by the client communications device 120, the user of the client communications device 120 (after completion of step 202-3) now begins paying for use of the resource at a more accurate and appropriate rate or charge per unit of time for that resource. If the resource allocation is reduced, more of the resource is made available for other devices which might require use of the resource. Conversely, if more of the resource allocation is increased, then the service provider offering the resource gains more revenue and the device 110 will have indicated an actual need for the additional resources.

Since the general processing functions of step 202 (i.e., step 202-1 through 202-3) periodically negotiate a new value of the current resource setting upon detecting any one of the negotiation events previously described during performance of communications using the communications channel 130 by the client communications device 120, the value of the current resource setting (i.e., the actual allocation of the resource to the communications channel 130 on behalf of the client indications device 120) and its associated cost are constantly being updated to more accurately reflect the requirements of the resource by the client communications device 120.

Figure 3:
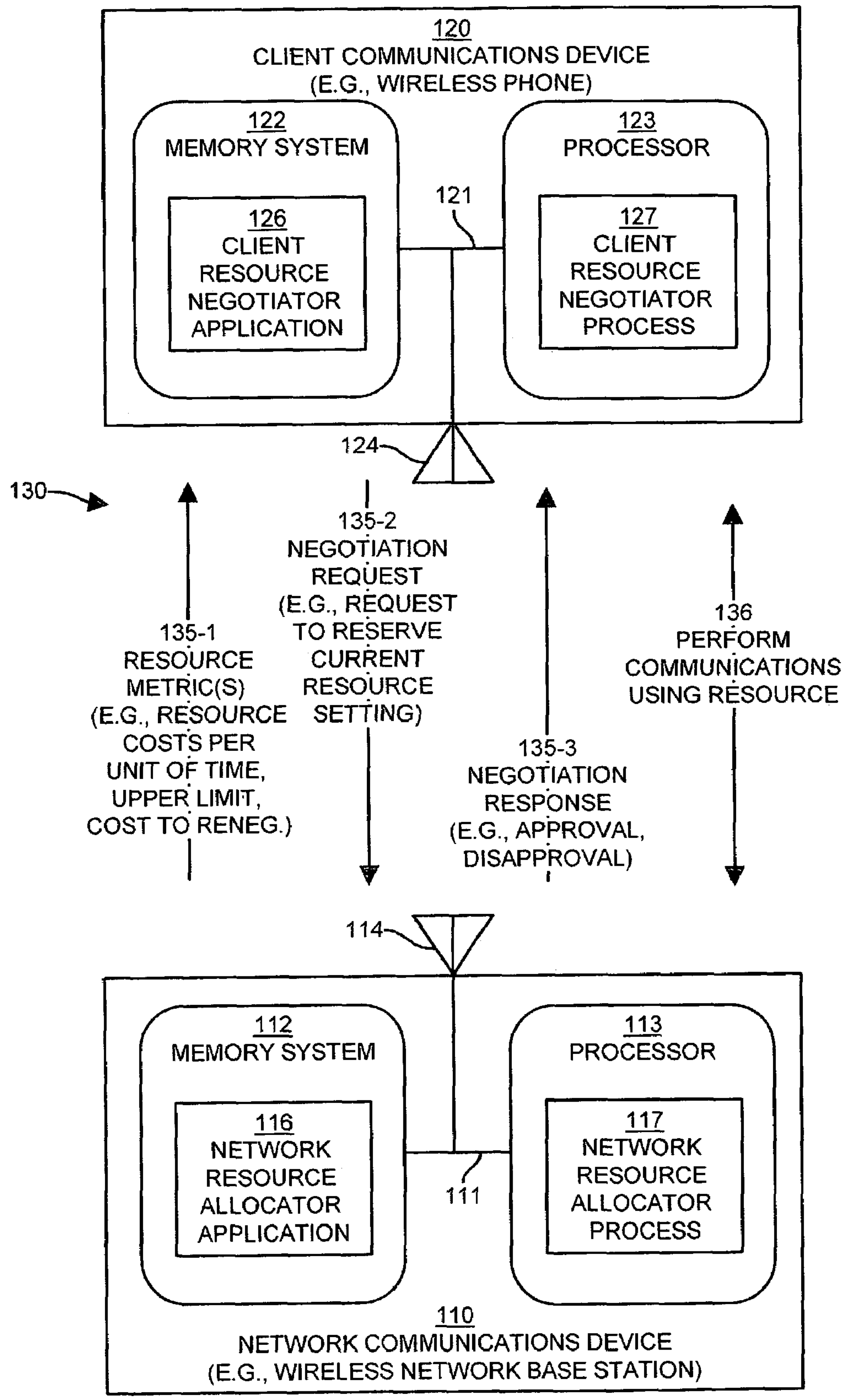
FIG. 3 illustrates a more detailed architecture of client and network data communications devices and shows certain communications that take place between such devices according to embodiments of the invention.

FIG. 3 illustrates an example architecture of both the client communications device 120 and the network communications device 110 configured according to embodiments of the invention.

The client communications device 120 includes an interconnection mechanism 121 which couples a memory system 122, a processor 123, and a communications interface 124. The memory system 122 is any type of computer readable medium which can be encoded with a client resource negotiator application 126. The processor 123 may be any type of processing device such as a microprocessor, circuitry or an application-specific integrated circuit (ASIC) that can execute, run, interpret or otherwise perform the client resource negotiator application 126. The communications interface 124 may be any type of network interface that is capable of performing communications with another electronic or computerized device, such as the network communications device 110 in this example. The communications interface 124 may support wireless and/or land-line voice, data or other types of communications using many types of communications protocols, mechanisms and techniques as are widely known in the art.

The client resource negotiator application 126 encoded within the memory system 122 in FIG. 3 represents any type of software code (e.g., object code), data, logic instructions, or other information which represents an application configured in accordance with embodiments of the invention within the memory system 122. The processor 123 can execute, run, interpret or otherwise perform all or portions of the software code that forms the client resource negotiator application 126. When doing so, the processor 123 forms the client resource negotiator process 127 which operates according to embodiments of the invention to provide the functionality explained herein. The client resource negotiator application 126 encoded within the memory system 122 thus represents one embodiment of the invention which is contained within a computer readable medium such as a random access memory (RAM), a read-only memory (ROM), a programmable read-only memory (e.g., EPROM, EEPROM, etc.), or other computer readable medium (e.g., floppy disk, hard disk or any other storage mechanism).

It is to be understood that there can be multiple processors 123 with the client communications device 120. Each of the multiple processors 123 might execute or otherwise perform one of more client resource negotiator processes 127, or alternatively, the client resource negotiator process or processes 127 might be divided into separately operating subroutines, applets, or other modules which collectively operate within the client communications device 120 to achieve effects of the invention. In other words, the client resource negotiator process 127 might operate in a distribute manner as individual modules.

As noted above, the client communications device 120 can be any type of computerized or electronic device which can perform communications over any type of network medium with one or more network communications devices 110, or with one or more other client communications devices 120 via a communications channel 130 (FIG. 1). Generally, in FIG. 3, the combination of the client resource negotiator application 126 and the client resource negotiator process 127 collectively comprise the client resource negotiator 125 as illustrated in FIG. 1.

Also as shown in FIG. 3, a network communications device 110 includes an interconnection mechanism 111 which couples a memory system 112, a processor 113, and a communications interface 114. The memory system 112 may be any type of computer readable medium. The memory system 112 is encoded with a network resource allocator application 116. The processor 113 may be any type of processing device such as a microprocessor, circuitry or an application-specific integrated circuit (ASIC) that can execute, run, interpret or otherwise perform the network resource allocator application 116. The communications interface 114 to be any type of network interface that is capable of performing communications with one or more electronic or computerized devices, such as the client communications device 120 in this example. The communications interface 114 may support wireless and/or land-line voice, data or other types of communications using many types of communications protocols, mechanisms and techniques as is widely known in the art.

The network resource allocator application 116 encoded within the memory system 112 in FIG. 3 represents any type of software code (e.g., object code), data, logic instructions, or other information which represents an application. The processor 113 can execute, run, interpret or otherwise perform all or portions of the software code that forms the client resource negotiator application 116. When doing so, the processor 113 forms the network resource allocator process 117 which operates to reserve, allocate, or otherwise associate resources to, or on behalf of, a specific communications device 110 or a process 127 operating therein when instructed to do so during the negotiations of a current resource setting as explained herein. In addition, the network resource allocator process 117 can also be responsible for the collection of charge information about users, collecting statistics about users, keeping track of and updating usage costs and charges, and so forth.

As noted above, the network communications device 110 can be any type of computerized or electronic device which can perform communications over any type of network medium with one or more client communications devices 120, or with one or more other network communications devices 110 via a communications channel 130 (FIG. 1). Generally, in FIG. 3, the combination of the network resource allocator application 116 and the network resource allocator process 117 collectively comprise the network resource allocator 115 as illustrated in FIG. 1.

FIG. 3 also illustrates some of the resource negotiation communications 135 or handshaking that takes place with respect to embodiments of the invention over the communications channel 130 (or over an out-of-band control channel) between the client communications device 120 and the network communications device 110.

Specifically, the resource negotiation communications 135 include transmission of resource metrics 135-1 from the network resource allocator process 117 within the network communications device 110 to the client resource negotiator process 127 operating within the client communications device 120. The resource metrics 135-1 can indicate, for example, a cost of one or more resources per unit of time for resource(s) associated with the communications channel 130. By way of example, one resource metric 135-1 might indicate that a bandwidth resource established at a level of 20 kbps may incur a cost of 10 cents per minute if allocated to the client communications device 120. The resource metrics 135-1 might indicate many other costs for other respective levels of resource allocation as well. The resource metrics 135-1 can also indicate, for example, an upper limit or maximum resource setting and/or a lower limit or minimum resource setting at which a particular resource can be established or set. The resource metrics 135-1 can also include a cost or charge that will be incurred each time the client communications device 120 requests to renegotiate the new value for a current resource setting (i.e., the cost to renegotiate).

One purpose of providing the resource metrics 135-1 from the network communications device 110 to each client communications device 120 is so that the client resource negotiator process 127 operating according to embodiments of the invention in each device 110 can properly determined accrued usage costs for particular resources associated with the communications channel 130, as those resources are allocated, utilized or consumed when performing communications over the communications channel 130.

The resource negotiation communications 135 can also include a negotiation request 135-2 which the client communications device 120 transmits to the network communications device 110 in order to request or reserve a new value for a current resource setting in order to allocate the specified resource and a particular value or level on behalf of the client communications device 120. As previously explained, and as will be explained with respect to other embodiments of the invention, the client resource negotiator process 127 provides a negotiation request 135-2 (also called a renegotiation request) to the network resource allocator process 117 operating in the network communications device 110 upon detecting a negotiation event.

The network resource allocator process 117 can transmit a negotiation response 135-3 to the client resource negotiator process 127 which indicates an approval or disapproval of the negotiation request 135-2 (i.e., the request to reserve a new value for a current resource setting) for a particular resource of the communications channel 130.

In addition to the resource negotiation communications 135 which take place between the client communications device 120 and the network communications device 110, the devices 110 and 120 can concurrently perform communications (e.g., voice and/or data communications) using the resource as shown at 136 in FIG. 3. That is, the client and network communications devices 110, 120 can perform embodiments of the invention concurrently while performing communications using resource(s) of the communications channel 130 that is/are allocated according to the techniques of the invention.

Figure 4:
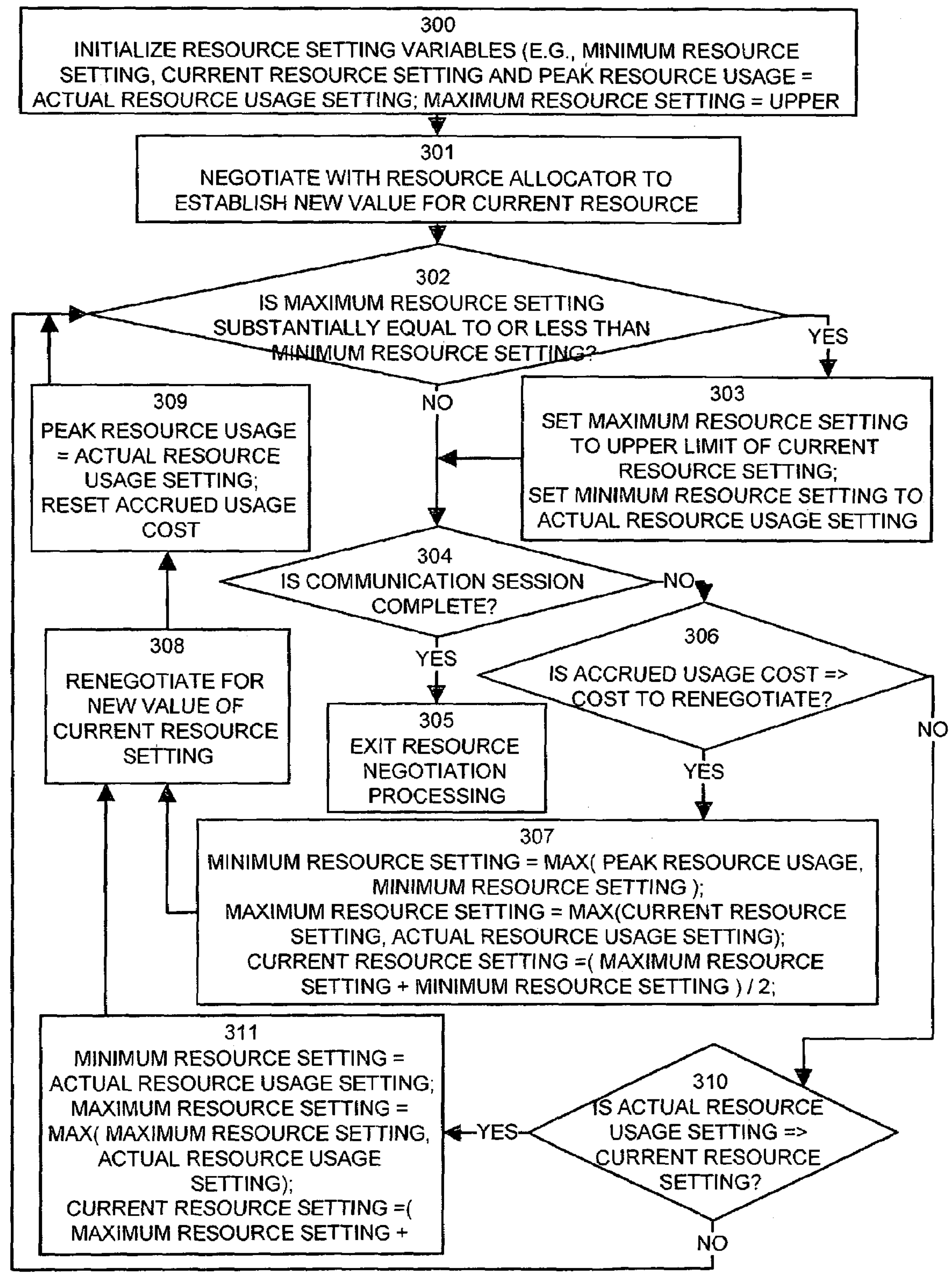
FIG. 4 is a more detailed flow chart illustrating an implementation of a resource allocation algorithm of one embodiment of the invention which provides allocation of resources in a data communications channel.

FIG. 4 illustrates a flow chart of processing steps which the client resource negotiator process 127 performs according to one embodiment of the invention to adjust or control the allocation and usage of a resource of a data communications channel 130 between the client communications device 120 and another device, such as the network communications device 110.

In step 300, the client resource negotiator process 127 initializes various resource setting variables within the client communications device 120. In this example, the client resource negotiator process 127 initializes values of a minimum resource setting, a current resource setting and a peak resource setting to be equal to a value of an actual resource usage setting.

The minimum resource setting represents the value of the lowest limit or level at which the network resource allocator process 117 can allocate the resource according to the processing of this embodiment of the invention.

The current resource setting represents the current or static allocation of the resource in support of the communications channel 130 during operation of this embodiment of the invention. That is, the current resource setting is the level of resource allocation for which the user of the client communications device pays for per unit of time. The current resource setting can change each time the value is renegotiated to a different level having a different cost per unit of time so as to adjust the usage of the resource and hence the cost paid for the resource.

The peak resource setting reflects the peak value of the actual resource usage setting that is attained between operations of negotiating for values of the current resource setting. In other words, the peak resource setting reflects the maximum value that the actual resource usage setting attains while performing communications during the time period between successive negotiations for values of the current resource setting.

As noted above, the actual resource usage setting represents a current actual dynamic usage of the particular resource or resources to which the system of the invention is able to allocate usage according to the processing shown in the embodiment in FIG. 4. That is, the actual resource usage setting can constantly vary over time depending upon the usage of the resource by the device 110 at that point in time. Embodiments of the invention preferably establish the current resource setting at a value somewhat above the actual resource usage setting, but not so far above as to allocate too much of the resource as might be required at some point in time in the future (i.e., without over allocating the resource).

To begin processing this embodiment of the invention then, the current resource setting and the minimum resource setting are each initially set to the value of the actual resource usage setting that reflects the current real-time state of usage of the resource in support of performance of communications between the client communications device 120 and the network communications device 110.

In step 300, the client resource negotiator process 127 also initializes a maximum resource setting to be equal to the value of an upper limit of the current resource setting of the resource of the data communications channel 130. In other words, in step 300, the client resource negotiator process 127 sets the maximum resource setting to the highest value or level to which the resource may be set or allocated. Once the initialization is complete, processing proceeds the step 301.

In step 301, the client resource negotiator process 127 negotiates with the network resource allocator process 117 to establish the new value for the current resource setting.

Next, in step 302, the client resource negotiator process 127 determines if the maximum resource setting substantially equals or is smaller then (i.e., less than) the minimum resource setting. As will be explained shortly, the processing shown in FIG. 4 is iterative in nature and thus the maximum and minimum resources setting can change during computation and renegotiation of new values for the current resource setting. Accordingly, the processing in step 302 allows the client resource negotiator process 127 to detect when these values approach each other (i.e., are substantially equal) and allows them to be reset as will be explained later with respect to step 303.

For this example, assume that the maximum and minimum resource settings are not substantially equal to each other at the start of processing. As such, processing proceeds to step 304.

In step 304, the client resource negotiator process 127 determines if the communications session that uses the resource on the communications channel 130 is complete. If the communications session has ended, then processing proceeds to step 305 at which point the client communications device 110 and the network communications device 120 exit or terminate resource negotiation processing (i.e., the processing in FIG. 4).

In step 304, if the communications session is still in progress (i.e., the communications channel 130 is still using the resource allocated at the current resource setting), then processing proceeds to step 306.

In step 306, the client resource negotiator process 127 performs a check for a negotiation event by determining if an accrued usage cost of the resource allocated at the current resource setting (i.e., the accrued cost of using the resource while performing communications) is equal to (or substantially equal to) or is greater than the cost to renegotiate. If this negotiation event occurs, processing proceeds to step 307.

In step 307, the client resource negotiator process 127 calculates a new value for a minimum resource setting and calculates a new value for a maximum resource setting. Based on these values, the client resource negotiator process 127 then calculates a new value for the current resource setting to be a new value approximately between the value for the minimum resource setting and the value for the maximum resource setting. In this particular embodiment then, the current resource setting is thus calculated to be set to a level above the actual resource usage setting (i.e., above the actual current usage of the resource at that moment in time) but below the former current resource setting. In this manner, the current resource setting converges to a more cost effective value based on actual usage requirement of the client communications device 110.

In this particular example embodiment, in step 307, the client resource negotiator process 127 calculates the new value for a minimum resource setting to be a maximum of a peak resource usage setting and a current value of the minimum resource setting. In other words, the minimum resource setting is set to either the peak resource usage setting (i.e., the peak value of resource usage attained since the last renegotiation) or the minimum resource setting, whichever is greater.

Also in this example embodiment, in step 307, the client resource negotiator process 127 calculates the new value for a maximum resource setting to be the maximum of either the value of the current resource setting or the value of the actual resource usage setting. Based on these calculations, the current resource setting is then set at the midpoint value between the maximum and minimum resource setting values. In this manner, the current resource setting is set to a value that more closely approximates actual resource usage requirements. This establishes a new and lower resource cost per unit of time for the resource in use by the client communications device 110. The new cost more accurately reflects the cost of the actual usage of the resource. After step 307 is complete, processing proceeds to step 308 where the resource is allocated according to the new value of the current resource setting via renegotiation.

In step 308, the client resource negotiator process 127 renegotiates with the network resource allocator process 117 in order to have the process 117 reserve, allocate, set aside or otherwise establish the allocation of the resource of the data communications channel 130 according to the new value of the current resource setting as calculated in step 307.

Next, in step 309, the client resource negotiator process 127 resets the peak resource usage setting to be equal to the value of the actual resource usage setting. Also in step 309, the accrued cost of the actual resource usage setting is reset back to a null value or zero. In this manner, the test for the negotiation event in step 306 (the accrued usage cost being substantially equal to or exceeding the cost to renegotiate) is reset so that the accrued usage cost can begin to accumulate based on the new value for the current resource setting (i.e., can begin to be calculated based on the new allocation of the resource, which is calculated in step 308 and which is established or set in step 309).

After processing step 309, the processing of the client resource negotiator process 127 returns to step 302. As noted above, in step 307, the client resource negotiator calculates new values for the minimum and maximum resource settings for use in determining the value for the current resource setting. Upon returning to step 302, the client resource negotiator process 127 makes the determination if the maximum resource setting value is substantially smaller then or equal to the minimum resource setting value. If this is the case in step 302, processing proceeds to step 303.

In step 303, the client resource negotiator process 127 sets the value of the maximum resource setting to the upper limit of the current resource setting and sets the value of the minimum resource setting to be the actual resource usage setting. Stated differently, in step 303, if the minimum and maximum resource setting values have converged to be substantially similar in value (as determined in step 302), then each is reset to a higher maximum in this embodiment. The client negotiator process 127 resets the maximum to the highest allowable resource setting (the upper limit), and resets the minimum to be the actual value of the resource in use at that moment in time. After processing step 303, the processing of the client resource negotiator process 127 returns to performs the conditional tests in steps 304, 306 and so forth.

Returning attention now back to the initial iteration of step 306, if the negotiation event, indicating that an accrued usage cost is substantially equal to or greater than a cost to renegotiate, has not happened at this point in time (i.e., upon processing step 306 during performance of communications on the communications channel 130 using the resource for which the accrued cost is being tracked), then processing of the client resource negotiator process 127 proceeds to step 310 in an attempt to detect another negotiation event.

In step 310, the client resource negotiation process 127 attempts to detect a negotiation event indicating if the actual resource usage setting (i.e., the current amount of the resource actually in use at this point in time on the communications channel) is substantially equal to or greater than the current resource setting (the amount allocated for use). In other words, in step 310, the client resource negotiator process 127 checks to see if the current usage of the resource at the point in time of processing step 310 is equal to or above the value of the current resource setting (the total amount available or allocated for use, or in other words, the amount being paid for). If the test is true, then the client communications device 110 is attempting to use more of the resource of the data communications channel than which it has allocated. If this is the case, processing proceeds to step 311.

In step 311 (like in step 307), the client resource negotiator process 127 calculates a new value for a minimum resource setting and calculates a new value for a maximum resource setting. Based on these values, the client resource negotiator process 127 then calculates a new value for the current resource setting to be a new value approximately between the value for the minimum resource setting and the value for the maximum resource setting. In this particular embodiment, in step 311, the current resource setting is calculated to be set to a level above the actual resource usage setting (i.e., above the actual current usage of the resource at that moment in time). In this manner, the current resource setting converges to a more cost effective value based on actual usage requirement of the client communications device 110.

In this particular example embodiment, in step 311, the client resource negotiator process 127 calculates the new value for a minimum resource setting to be the value of the actual resource usage setting. In other words, the minimum resource setting is set to the actual real-time use value of the resource of the communications channel 130 at that point in time. Also in step 311, the maximum resource setting is set to either the maximum resource setting or the actual resource usage setting, whichever is greater. Based on these calculations, the current resource setting is then set at the midpoint value between the maximum and minimum resource setting values. In this manner, the current resource setting is set to a value that more closely approximates actual resource usage requirements which have risen since the last negotiation. This establishes a new and higher resource cost per unit of time for the client communications device 110 that more accurately reflects the cost of the actual usage of the resource. After step 311 is complete, processing proceeds to step 308 where the resource is allocated according to the new value of the current resource setting via renegotiation, as explained above.

In this manner, embodiments of the present invention can dynamically allocate resources for use in a communications channel according to usage requirements, rather than according to an estimate that does not take into account costs, usage requirements or changes in network conditions.

The foregoing description of embodiments of the invention are not intended to be limiting. Rather, any limitations to embodiments of the invention are presented in the following claims.

What is claimed is:

1. A method for adjusting usage of a resource of a communications channel, the method comprising the steps of:

negotiating a current resource setting for usage of the resource of the communications channel;

performing communications on the communications channel using the resource; and periodically renegotiating a new value for the current resource setting upon detecting a negotiation event during performance of communications on the communications channel using the resource, the negotiation event indicating that an accrued usage cost of the resource of the communications channel is at least one of i) substantially equals to a cost to renegotiate the current resource setting; and ii) exceeds a cost to renegotiate the current resource setting, wherein the step of periodically renegotiating a new value for the current resource setting upon detecting a negotiation event comprises the steps of:

detecting a negotiation event related to the resource;

in response to the step of detecting, calculating a new value for the current resource setting that more closely approximates a value of an actual resource usage of the resource of the communications channel; and negotiating with a resource allocator to establish the new value for the current resource setting, and wherein if a value of the actual resource usage setting is lower than a former value of the actual resource usage setting, the new value of the current resource setting is calculated to be lower than a former value of the current resource setting.

2. The method of claim 1 wherein the negotiation event indicates at least one of:

i) that an actual resource setting of the communications channel substantially equals the current resource setting for the communications channel;

ii) that an actual resource setting of the communications channel substantially exceeds the current resource setting for the communications channel.

3. The method of claim 1 wherein the resource is a bandwidth setting of the communications channel and wherein the negotiation event indicates that a data communications device using the bandwidth setting of the communications channel has requested to negotiate a new value for the current resource setting for the bandwidth setting of the communications channel.

4. The method claim 1 wherein if a value of the actual resource usage setting is higher than a former value of the actual resource usage setting, the new value of the current resource setting is calculated to be at least one of:

i) higher than a new value of the actual resource usage setting; and ii) substantially equal to the new value of the actual resource usage setting.

5. The method of claim 1 wherein the step of calculating a new value for the current resource setting comprises the steps of:

calculating a new value for a minimum resource setting;

calculating a new value for a maximum resource setting;

calculating the new value for the current resource setting to be a new value approximately between the value for the minimum resource setting and the value for the maximum resource setting.

6. The method of claim 1 wherein the negotiation event indicates an accrued usage cost of the resource of the communications channel, the accrued usage cost being greater than or substantially equal to a cost to negotiate the new value of the current resource setting.

7. The method of claim 1 wherein the step of negotiating a comprises:

calculating a new value for a minimum resource setting;

calculating a new value for a maximum resource setting;

calculating the new value of the current resource setting to be a new value approximately between the value for the minimum resource setting and the value for the maximum resource setting.

8. A method for adjusting usage of a resource of a communications channel, the method comprising the steps of:

negotiating a current resource setting for usage of the resource of the communications channel;

performing communications on the communications channel using the resource; and periodically renegotiating a new value for the current resource setting upon detecting a negotiation event during performance of communications on the communications channel using the resource, the negotiation event indicating that an accrued usage cost of the resource of the communications channel is at least one of i. substantially equals to a cost to renegotiate the current resource setting; and ii. exceeds a cost to renegotiate the current resource setting, wherein the step of periodically renegotiating a new value for the current resource setting upon detecting a negotiation event comprises the steps of;

detecting a negotiation event related to the resource;

in response to the step of detecting, calculating a new value for the current resource setting that more closely approximates a value of an actual resource usage of the resource of the communications channel; and negotiating with a resource allocator to establish the new value for the current resource setting, wherein the step of calculating a new value for the current resource setting comprises the steps of:

calculating a new value for a minimum resource setting;

calculating a new value for a maximum resource setting;

calculating the new value for the current resource setting to be a new value approximately between the value for the minimum resource setting and the value for the maximum resource setting, wherein the step of calculating the new value for the current resource setting further comprises the steps of:

calculating a summation value to be the sum of the new value for the maximum resource setting and the new value for the minimum resource setting;

calculating the new value for the current resource setting to be the summation value divided by two; and setting a value of a peak resource usage to be a current value of the actual resource usage.

9. The method of claim 8 wherein:

the step of calculating a new value for a minimum resource setting calculates the new value of the minimum resource setting to be a maximum of a peak resource usage and a current value of the minimum resource setting; and the step of calculating a new value for a maximum resource setting sets the new value of the maximum resource setting to be the value of the current resource setting.

10. The method of claim 9 wherein the negotiation event indicates that an accrued usage cost of the resource of the communications channel is at least one of i) substantially equals to a cost to renegotiate the current resource setting; and ii) exceeds a cost to renegotiate the current resource setting.

11. The method of claim 8 wherein:

the step of calculating a new value for a minimum resource setting sets the new value of the minimum resource setting to be the value of the current resource setting; and the step of calculating a new value for a maximum resource setting calculates the new value of the maximum resource setting to be a maximum of a maximum resource setting and a current value of the actual resource usage setting.

12. The method of claim 11 wherein the negotiation event indicates at least one of:

i) that an actual resource setting of the communications channel substantially equals the current resource setting for the communications channel; and ii) that an actual resource setting of the communications channel substantially exceeds the current resource setting for the communications channel.

13. The method of claim 8 further including the step of:

setting the maximum resource setting to a value of an upper limit of the current resource setting and setting the minimum resource setting to a value of the actual resource usage setting if, during the performance of communications on the communications channel using the resource, the maximum resource setting substantially equals the minimum resource setting.

14. The method of claim 8 wherein the step of negotiating a current resource setting for usage of the resource of the communications channel comprises the steps of:

initializing the new value for the minimum resource setting, the new value for the current resource setting, and a value for a peak resource usage to be a current value of the actual resource usage of the resource of the communications channel;

initializing the new value for a maximum resource setting to be a value of an upper limit of the current resource setting of the resource of the communications channel; and negotiating with a resource allocator to establish the new value for the current resource setting.

15. A communications device comprising:

an communications interface;

a memory system;

a processor; and an interconnection mechanism coupling the communications interface, the memory system, and the processor;

wherein the memory system is configured with a resource negotiation application, that when performed on the processor, provides a resource negotiation process to adjust usage of a resource of a communications channel by performing the operations of:

negotiating a current resource setting for usage of the resource of the communications channel;

performing communications on the communications channel using the resource; and periodically negotiating a new value for the current resource setting upon detecting a negotiation event during performance of communications on the communications channel using the resource, the negotiation event indicating that an accrued usage cost of the resource of the communications channel is at least one of i) substantially equals to a cost to renegotiate the current resource setting; and ii) exceeds a cost to renegotiate the current resource setting, wherein when the resource negotiator process performs the operation of periodically renegotiating a new value for the current resource setting upon detecting a negotiation event, the resource negotiation process performs the operations of:

detecting a negotiation event related to the resource;

in response to the step of detecting, calculating a new value for the current resource setting that more closely approximates a value of an actual resource usage of the resource of the communication channel; and negotiating with a resource allocator to establish the new value for the current resource setting;

wherein if a value of the actual resource usage setting is lower than a former value of the actual resource usage setting, the new value of the current resource setting is calculated to be lower than a former value of the current resource setting.

16. The communications device of claim 15 wherein the negotiation event indicates at least one of:

i) that an actual resource setting of the communications channel substantially equals the current resource setting for the communications channel; and ii) that an actual resource setting of the communications channel substantially exceeds the current resource setting for the communications channel.

17. The communications device of claim 15 wherein the resource is a bandwidth setting of the communications channel and wherein the negotiation event indicates that a data communications device using the bandwidth setting of the communications channel has requested to negotiate a new value for the current resource setting for the bandwidth setting of the communications channel.

18. The method of claim 15 wherein if a value of the actual resource usage setting is higher than a former value of the actual resource usage setting, the new value of the current resource setting is calculated to be at least one of:

i) higher than a new value of the actual resource usage setting; and ii) substantially equal to the new value of the actual resource usage setting.

19. The communications device of claim 15 wherein when the resource negotiator process performs the operation of calculating a new value for the current resource setting, the resource negotiator process performs the operations of:

calculating a new value for a minimum resource setting;

calculating a new value for a maximum resource setting;

calculating the new value for the current resource setting to be a new value approximately between the value for the minimum resource setting and the value for the maximum resource setting.

20. A communications device comprising:

an communications interface;

a memory system;

a processor; and an interconnection mechanism coupling the communications interface, the memory system, and the processor;

wherein the memory system is configured with a resource negotiation application, that when performed on the processor, provides a resource negotiation process to adjust usage of a resource of a communications channel by performing the operations of:

negotiating a current resource setting for usage of the resource of the communications channel;

performing communications on the communications channel using the resource; and periodically renegotiating a new value for the current resource setting upon detecting the negotiation event during performance of communications on the communications channel using the resource, the negotiation event indicating that an accrued usage cost of the resource of the communications channel is at least one of i) substantially equals to a cost to renegotiate the current resource setting; and ii) exceeds a cost to renegotiate the current resource setting; wherein when the resource negotiator process performs the operation of periodically renegotiating a new value for the current resource setting upon detecting a negotiation event, the resource negotiation process performs the operations of:

detecting a negotiation event related to the resource;

in response to the step of detecting, calculating a new value for the current resource setting that more closely approximates a value of an actual resource usage of the resource of the communication channel; and negotiating with a resource allocator to establish the new value for the current resource setting, wherein when the resource negotiator process performs the operation of calculating a new value for the current resource setting, the resource negotiator process performs the operation of;

calculating a new value for a minimum resource setting;

calculating a new value for a maximum resource setting;

calculating the new value for the current resource setting to be a new value approximately between the value for the minimum resource setting and the value for the maximum resource setting, wherein when the resource negotiator process performs the operation of calculating the new value for the current resource setting, the resource negotiator process performs the further operations of:

calculating a summation value to be the sum of the new value for the maximum resource setting and the new value for the minimum resource setting;

calculating the new value for the current resource setting to be the summation value divided by two; and setting a value of a peak resource usage to be a current value of the actual resource usage.

21. The communications device of claim 20 wherein:

the operation of calculating a new value for a minimum resource setting calculates the new value of the minimum resource setting to be a maximum of a peak resource usage and a current value of the minimum resource setting; and the operation of calculating a new value for a maximum resource setting sets the new value of the maximum resource setting to be the value of the current resource setting.

22. The communications device of claim 21 wherein the negotiation event indicates that an accrued usage cost of the resource of the communications channel is at least one of i) substantially equals to a cost to renegotiate the current resource setting; and ii) exceeds a cost to renegotiate the current resource setting.

23. The communications device of claim 20 wherein:

the operation of calculating a new value for a minimum resource setting sets the new value of the minimum resource setting to be the value of the current resource setting; and the operation of calculating a new value for a maximum resource setting calculates the new value of the maximum resource setting to be a maximum of a maximum resource setting and a current value of the actual resource usage setting.

24. The communications device of claim 23 wherein the negotiation event indicates at least one of:

i) that an actual resource setting of the communications channel substantially equals the current resource setting for the communications channel; and ii) that an actual resource setting of the communications channel substantially exceeds the current resource setting for the communications channel.

25. The communications device of claim 20 wherein the resource negotiator process further performs the operations of:

setting the maximum resource setting to a value of an upper limit of the current resource setting and setting the minimum resource setting to a value of the actual resource usage setting if, during the performance of communications on the communications channel using the resource, the maximum resource setting substantially equals the minimum resource setting.

26. The communications device of claim 20 wherein when the resource negotiator process performs the operation of negotiating a current resource setting for usage of the resource of the communications channel, the resource negotiator process performs the operations of:

initializing the new value for the minimum resource setting, the new value for the current resource setting, and a value for a peak resource usage to be a current value of the actual resource usage of the resource of the communications channel;

initializing the new value for a maximum resource setting to be a value of an upper limit of the current resource setting of the resource of the communications channel; and negotiating with a resource allocator to establish the new value for the current resource setting.

* * * * *